US008260563B2

(12) United States Patent
Seberger (10) Patent No.: US 8,260,563 B2
(45) Date of Patent: Sep. 4, 2012

(54) COMMON-MODE NOISE REDUCTION CIRCUIT

(75) Inventor: Stephen G. Seberger, Marshalltown, IA (US)

(73) Assignee: Fisher Controls International LLC, Marshalltown, IA (US)

(*) Notice: Subject to any disclaimer, the term of this patent is extended or adjusted under 35 U.S.C. 154(b) by 646 days.

(21) Appl. No.: 12/392,864

(22) Filed: Feb. 25, 2009

(65) Prior Publication Data

US 2010/0214036 A1    Aug. 26, 2010

(51) Int. Cl.
*G01R 15/00*    (2006.01)
(52) U.S. Cl. ............... 702/57; 702/64; 702/66; 702/89; 702/117; 702/189
(58) Field of Classification Search .......... 702/66, 702/64, 89, 117, 189, 57; 700/7, 11; 333/32; 324/612; 323/312, 280
See application file for complete search history.

(56) References Cited

U.S. PATENT DOCUMENTS

| | | | |
|---|---|---|---|
| 3,705,365 A | 12/1972 | Szabo et al. | |
| 6,052,420 A | 4/2000 | Yeap et al. | |
| 7,016,741 B2* | 3/2006 | Arntson | 700/19 |
| 7,545,656 B2* | 6/2009 | Lanni | 363/39 |
| 2005/0231182 A1 | 10/2005 | Huisenga et al. | |
| 2006/0251188 A1* | 11/2006 | Crawley et al. | 375/319 |

OTHER PUBLICATIONS

International Search Report for PCT/US2010/022826, mailed Jun. 4, 2010.
Written Opinion for PCT/US2010/022826, mailed Jun. 4, 2010.
International Preliminary Report on Patentability for PCT/US2010/022826, mailed Sep. 9, 2011.
Sherwin, Jim, "Understanding common-mode signals," Maxim Integrated Products, Apr. 17, 2003; retrieved from the Internet on May 11, 2010 at www.edn.com/contents/images/289 961.pdf.

* cited by examiner

*Primary Examiner* — Michael Nghiem
*Assistant Examiner* — Elias Desta
(74) *Attorney, Agent, or Firm* — Marshall, Gerstein & Borun LLP (57) ABSTRACT

A system operating in a process control environment includes a field device to perform a process control function in the process control environment, a remote device disposed away from the field device to perform an auxiliary function associated with the process control function of the field device, a first wired communication link communicatively coupled to the field device and to the remote device to support data communication between the field device and the remote device, and a common-mode noise reduction circuit coupled to the field device and to the wired communication link to reduce common-mode noise generated in the first wired communication link.

22 Claims, 5 Drawing Sheets

COMMON-MODE NOISE REDUCTION CIRCUIT

FIELD OF THE INVENTION

The present invention relates generally to analog signal processing and, in particular, to providing reliable communications between devices in the presence of common-mode noise.

TECHNICAL BACKGROUND

Process control systems, like those used in chemical, petroleum or other processes, typically include multiple field devices such as valves, valve positioners, switches, transmitters, and sensors (e.g., temperature, pressure, and flow rate sensors) disposed in various locations within a corresponding process plant to perform process control functions such as opening or closing valves, measuring process parameters, increasing or decreasing fluid flow, etc. Field devices typically communicate with one or more centralized or decentralized process controllers (which are in turn communicatively coupled to host or operator workstations) via analog, digital or combined analog/digital buses. Smart field devices such as field devices conforming to the well-known protocols such as FOUNDATION™ Fieldbus, Device-Net®, or HART®, may also perform control calculations, alarm functions, and other control functions commonly implemented within the process controller.

Some communication protocols used to transmit process control data to and from field devices are associated with a floating ground potential. In other words, the ground reference of devices using these protocols, or circuit ground, is allowed to float relative to the ground potential. To take one example, Foundation™ Fieldbus protocols require that Fieldbus communication links be isolated from ground. As one of the consequences of the floating ground requirement, power frequency noise coupled onto a Fieldbus network effectively modulates circuit ground of each participating device relative to ground. The actual amount of noise varies according to a particular installation, equipment, and certain environmental factors.

In general, several types of signaling on communication links having multiple wires or lines are known. A common-mode signal, for example, appears on both wires of a two-wire communication link. Accordingly, the common-mode voltage signal is the average of the two voltages, each voltage calculated relative to common ground. If the voltage on the first wire is $V_1$, and the voltage on the second wire is $V_2$, the common-mode voltage signal $V_{CM}$ is defines as:

$$V_{CM} = \frac{V_1 + V_2}{2}. \quad \text{(Equation 1)}$$

By contrast, a normal-mode signal $V_{NM}$ appears across the pair of wires in a two-wire configuration:

$$V_{NM} = V_2 - V \quad \text{(Equation 2)}$$

It will be noted that if the ground potential changes, each of the voltages $V_1$ and $V_2$ changes by an equal amount relative the previous value of the ground potential, and the normal-mode voltage signal $V_{NM}$ accordingly remains unaffected:

$$V_{NM} = (V_2 + V_\Delta) - (V_1 + V_\Delta) = V_2 - V_1 \quad \text{(Equation 3)}$$

In addition to transmitting and receiving process control data using communication protocols such as Foundation Fieldbus, some field devices also communicate with auxiliary devices via separate communication links using various signaling techniques (e.g., normal-mode, common-mode, differential-mode, etc.) and various communication protocols. For example, a digital valve controller (DVC) may communicate with a controller via a Fieldbus communication link and with a remote travel sensor via an auxiliary independent wired communication link. Signaling on the auxiliary wired communication link may be more susceptible to noise than signaling on the Fieldbus communication link. In particular, common-mode noise may prevent the DVC from accurately receiving signals from the remote travel sensor, which may be in the millivolt range.

SUMMARY

A device coupled to a wired communication link includes a common-mode noise reduction circuit that matches input AC impedance on some or all of the wires of the communication link in order to reduce the effect of common-mode noise on signals propagated through the communication link. In some embodiments, the common-mode noise circuit includes an active component such an operational amplifier that maintains AC voltage at some or all of the wires of the communication link at an approximately equal level relative to a ground potential of the device. In at least some of the embodiments, the ground potential of the device is a floating potential. Alternatively, the common-mode noise circuit may include a resistor and a capacitor connected to the ground potential of the device to approximately match two or more input impedances associated with the communication link. In some or all of the embodiments, the common-mode noise circuit does not alter DC impedances associated with the communication link so as to not attenuate a normal-mode signal on the communication link.

In some embodiments, the device is a field device operating in a process control environment that receives and transmits process control data via a wired network communication link using a communication protocol such as Foundation™ Fieldbus, for example, and communicates with a remote sensor or a similar auxiliary device via a wired sensor communication link. Further, the signaling scheme on the network communication link may require a floating ground potential, while the sensor communication link may require decoupling capacitors between each wire of the sensor communication link and the case ground of the field device. Accordingly, the common-mode noise reduction circuit reduces the common-mode noise that common-mode voltage on the network communication link introduces into the sensor communication link.

In some embodiments, the common-mode noise reduction circuit couples a reference voltage signal to a non-inverting input of an operational amplifier, one of the wires of the sensor communication link to an inverting input of the operational amplifier, and another one of the wires of the sensor communication link to an output of the operational amplifier. During operation, the operational amplifier maintains a certain AC voltage at the output so that the two wires coupled to the common-mode noise reduction circuit have an approximately equal input AC impedance relative to a circuit ground of the device. In an embodiment, the wire coupled to the inverting input of the operational amplifier carries a reference signal to or from a remote device, and the wire coupled to the output of the operational amplifier carries a measurement or positioning signal to or from the remote device. In other embodiments, the common-mode noise reduction circuit similarly matches input AC impedance of three or more wires.

The common-mode noise reduction circuit may further prevent attenuation of a normal-mode signal propagated via the sensor communication link. To this end, the common-mode noise reduction circuit may include capacitors coupled to the inverting input of the operational amplifier and the output of the operational amplifier to block DC voltage signals or signal components. Further, the common-mode noise reduction circuit may include a resistor coupled to the output of the operational amplifier to approximately match the input resistance between the wires coupled to the common-mode noise reduction circuit.

DETAILED DESCRIPTION OF THE DRAWINGS

DETAILED DESCRIPTION

Figure 1:
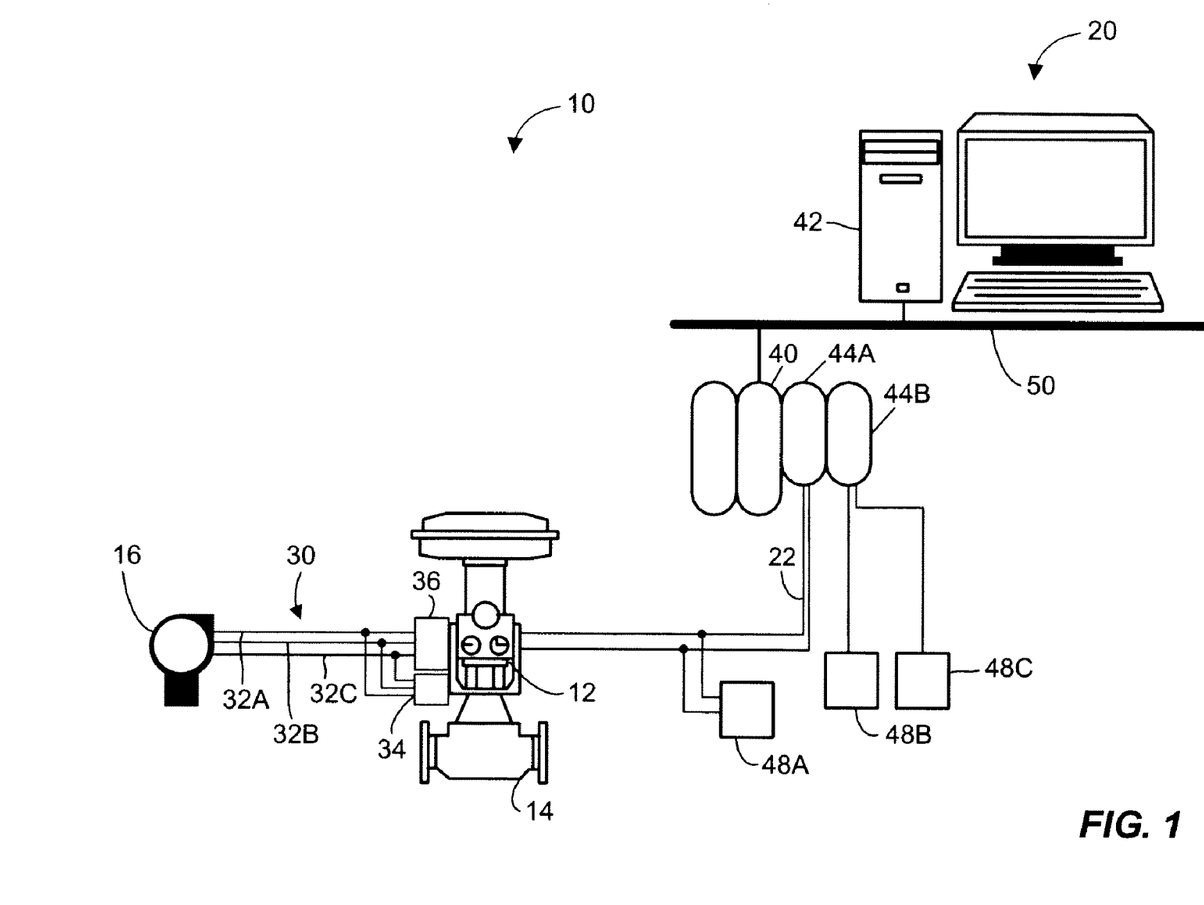
FIG. 1 illustrates a communication system in which a field device, equipped with a common-mode noise reduction circuit described herein, communicates with a process control system and a remote sensor device.

FIG. 1 illustrates a communication system 10 that includes a field device 12 operating on a valve 14, a remote device 16, and a process control network 20 to which the field device 12 is communicatively coupled. The field device 12 communicates with the process control network 20 via a communication link 22, and with the remote device 16 via a communication link 30 having several wires 32A-32C. The communication link 30 may be enclosed within a grounded conduit or shield. To reduce electromagnetic interference (EMI) on the communication link 30, an EMI reduction circuit 34 couples each of the wires 32A-32C to a case ground potential of the field device 12. Further, a common-mode noise reduction circuit 36 is coupled to the communication link 30 and resides inside or adjacently to the field device 12.

In operation, common-mode voltage noise on the communication link 22 frequently injects common-mode noise onto the floating circuit ground potential of the field device 12 relative to the case ground potential (i.e., earth) of the field device 12. The AC potential between the circuit and ground potentials is then coupled into the communication link 30 through the EMI reduction circuit 34 and through capacitance between the communication link 30 and the grounded conduit or shield. To prevent the common-mode noise from interfering with signaling on the communication link 30, the common-mode noise reduction circuit 36 matches AC impedance on some or all of the wires 32A-32C at the respective inputs to the signal processing circuitry of the field device 12. As a result, the amplitude of common-mode noise voltage on some or all of the wires 32A-32C is the same, the common-mode noise voltage on the communication link 30 consequently does not appear on the wires 32A-32C as a normal-mode signal. In other words, common-mode noise components on at least some of the wires 32A-32C cancel each other out for the purposes of signal processing at the field device 12. The common-mode noise reduction circuit 36 thus reduces, or substantially eliminates, the effect of noise on the communication link 30. From the perspective of the field device 12, the common-mode noise reduction circuit 36 effectively reduces common-mode noise associated with the signaling to and from the remote device 12. Accordingly, the term "noise reduction" is used herein to refer to reduction or cancellation of noise, reduction or cancellation of the effect of noise on one or several components, or to improving tolerance of a device such as the field device 12 to unwanted signaling on the corresponding communication link.

In at least some of the embodiments, the common-mode noise reduction circuit 36 does not alter DC impedance on some or all of the wires 32A-32C at the respective inputs to the circuitry of the field device 12. In this manner, the common-mode noise reduction circuit 36 does not attenuate a desired normal-mode input signal propagated through the communication link 30. The field device 12 can thus reliably and accurately communicate with the remote device 16 and the process control network 20 via the respective communication links 30 and 22.

Referring to the process control network 20, one or more process controllers 40 is connected to one or more host workstations or computers 42 (which may be any type of personal computer or workstation), and connected to banks of input/output (I/O) devices 44A and 44B each of which, in turn, is connected to one or more field devices 12 and 48A-48C. The controllers 40, which may be, by way of example only, DeltaV™ controllers sold by Fisher-Rosemount Systems, Inc., are communicatively connected to the host computers 42 via, for example, an Ethernet connection 50 or other communication link. Likewise, the controllers 40 are communicatively connected to field devices (such as the field device 12, for example) using any desired hardware and software associated with, for example, standard 4-20 ma devices and/or any smart communication protocol such as the Fieldbus or HART protocols. As is generally known, the controllers 40 implement or oversee process control routines stored therein or otherwise associated therewith and communicate with the field devices 12 and 48A-48C to control a process in any desired manner.

In general, the field devices 12 and 48A-48C may be any types of devices, such as sensors, valves, transmitters, positioners, etc. while the I/O cards within the banks 44A and 44B may be any types of I/O devices conforming to any desired communication or controller protocol such as HART, Foundation™ Fieldbus, Profibus, etc. In the embodiment illustrated in FIG. 1, the field devices 48B and 48C are standard 4-20 ma devices that communicate over analog lines to the I/O card 44B. The field devices 12 and 48A are smart devices, each capable of performing a physical step in the field (e.g., positioning, measurement, etc.) and performing logical steps to implement a particular part of the overall control strategy associated with the process control network 20. To this end, the smart field devices 12 and 48A may be equipped with a programmable micro-controller or a similar logical unit. Further, the smart field devices 12 and 48A may communicate with the I/O card 44A using a digital protocol, for example. Accordingly, the communication link 22 in this embodiment is a digital bus. The process control network 20 may also include, for example, HART field devices connected to a HART compatible I/O cards (not shown). Of course, the field devices 12 and 48A-48C and the banks of I/O cards 44A and 44B could conform to any other desired standards or protocols besides the 4-20 ma, HART or Fieldbus protocols, including any standards or protocols developed in the future.

To better illustrate the technical advantages the common-mode reduction circuit 30 provides to the communication system 10, a particular embodiment is discussed next with continued reference to FIG. 1. In this embodiment, the field device 12 is a digital valve controller (DVC) such as Fisher® DVC6000f manufactured by Emerson Process Management of Marshalltown, Iowa, and the communication link 22 is accordingly a digital bus that supports the Foundation Fieldbus communication protocol. The ground potential of the Fieldbus communication network including the communication link 22 and the circuitry of the field device 12 is referred to herein as circuit ground. The circuit ground of the Fieldbus communication network is a floating ground, i.e., the electric potential is expected to vary relative to an absolute potential, or ground. Meanwhile, the ground potential of the chassis of the field device 12 is referred to as case ground.

The remote device 16 in this embodiment is a travel sensor disposed at a certain distance away from the field device 12. It will be noted that the travel sensor sometimes may be placed at a distance of tens or even hundreds of feet from the DVC to obtain a remote reading of a position of a valve and supply the remote position signal to the DVC. Further, the communication link 30 in this embodiment implements normal-mode signaling, although the communication link 30 in general may support any desired technique including normal-mode, differential-mode, or common-mode signaling, as well as any desired communication protocol. The normal-mode signal traveling on the communication link 30 is a relatively sensitive signal having low peak-to-peak voltage. For example, the travel sensor may supply a signal of only several millivolt to the DVC. Fieldbus, by contrast, operates at approximately 0.5 Volt peak-to-peak and is generally not sensitive to fluctuations of a millivolt magnitude.

Because the signal on the communication link 30 is relatively sensitive, a grounded shield may surround the wires 32A-32C to protected the communication link 30 from EMI and, in particular, from radio frequencies (RF). Further, to reduce parasitic capacitive coupling in the wires 32A-32C, the EMI reduction circuit 34 may provide decoupling capacitors between each of the wires 32A-32C and the case ground of the field device 12. Meanwhile, it is possible for the floating ground potential of a Fieldbus communication network, i.e., the circuit ground, to vary by 30-50 V relative to ground during operation. An isolated, well-designed and closely contained circuit connected to such communication network can properly operate in the presence of this modulation relative to ground. However, because the field device 12 in this embodiment is connected to both a Fieldbus communication network via the communication link 22 and to the sensitive communication link 30, and because each of the wires of the communication link 30 is capacitively coupled to the case ground of the field device 12, the capacitors of the EMI reduction circuit 34 provide a path for common-mode noise to couple onto the communication link 30. The voltage difference between the circuit ground and the case ground thus results in modulation of a signal on the communication link 30 relative to the circuit ground, or common-mode noise.

More specifically, signals on each of the wires 32A-32C "see" different input impedances to circuit ground. For example, the wire 32B may carry the sensor signal from the remote device 16 while the wires 32A and 32C may carry the sensor excitation signal and the sensor reference signal, respectively. The sensor signal on the wire 32B may require a significantly higher DC impedance to properly process a differential signal between the wires 32B and 32C using a difference amplifier circuit, for example. In the absence of the common-mode noise reduction circuit 36, this difference in input impedances on the wires 32A-32C results in different voltages on the wires 32A-32C in response to the common-mode noise which couples onto the communication link 30 via the decoupling capacitors of the EMI reduction circuit 34. The field device 12 in turn sees the different noise-induced voltages on the wires 32A-32C as a normal-mode signal and sometimes fails to operate properly.

On the other hand, when the common-mode reduction circuit 36 matches input AC impedances on the wires 32A-32C relative to the circuit ground of the field device 12, the interfering voltage coupled onto the wires 32A-32C will have the same amplitude on each of the wires 32A-43C and will not therefore affect the normal-mode signal on the communication link 30 (see Equation 3 above). The common-mode reduction circuit 36 thus enables the field device 12 and the remote device 16 to accurately exchange data via the communication link 30 in the presence of common-mode noise and, in particular, when Fieldbus communications on the communication link 22 modulate case ground of the field device 12 relative to circuit ground.

Figure 3:
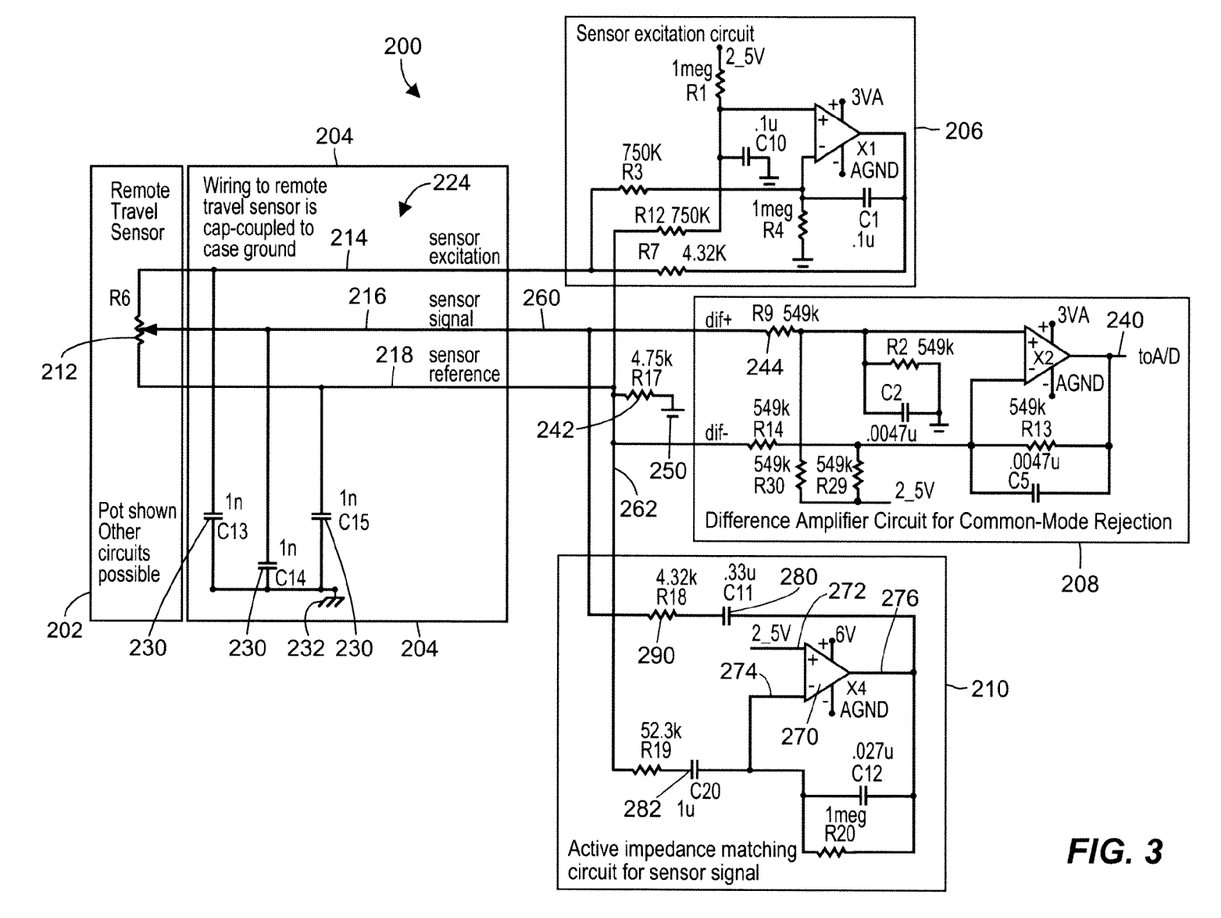
FIG. 3 illustrates an electrical circuit diagram of a potentiometer and a field device including a common-mode noise reduction circuit, a sensor excitation circuit, and a difference amplifier circuit.
Figure 4:
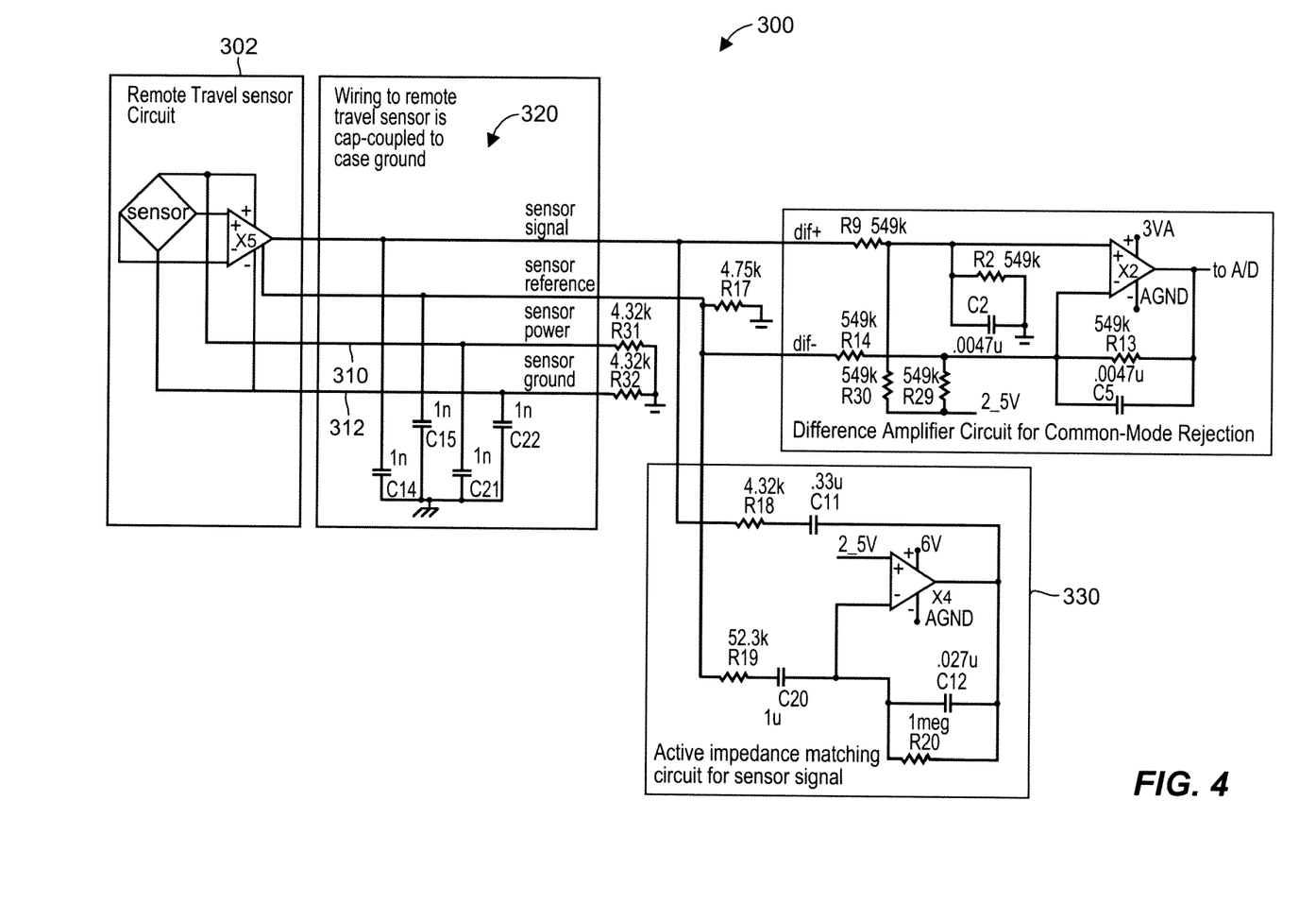
FIG. 4 illustrates an electrical circuit diagram of a powered travel sensor device and a field device having a common-mode noise reduction circuit, a sensor excitation circuit, and a difference amplifier circuit.
Figure 5:
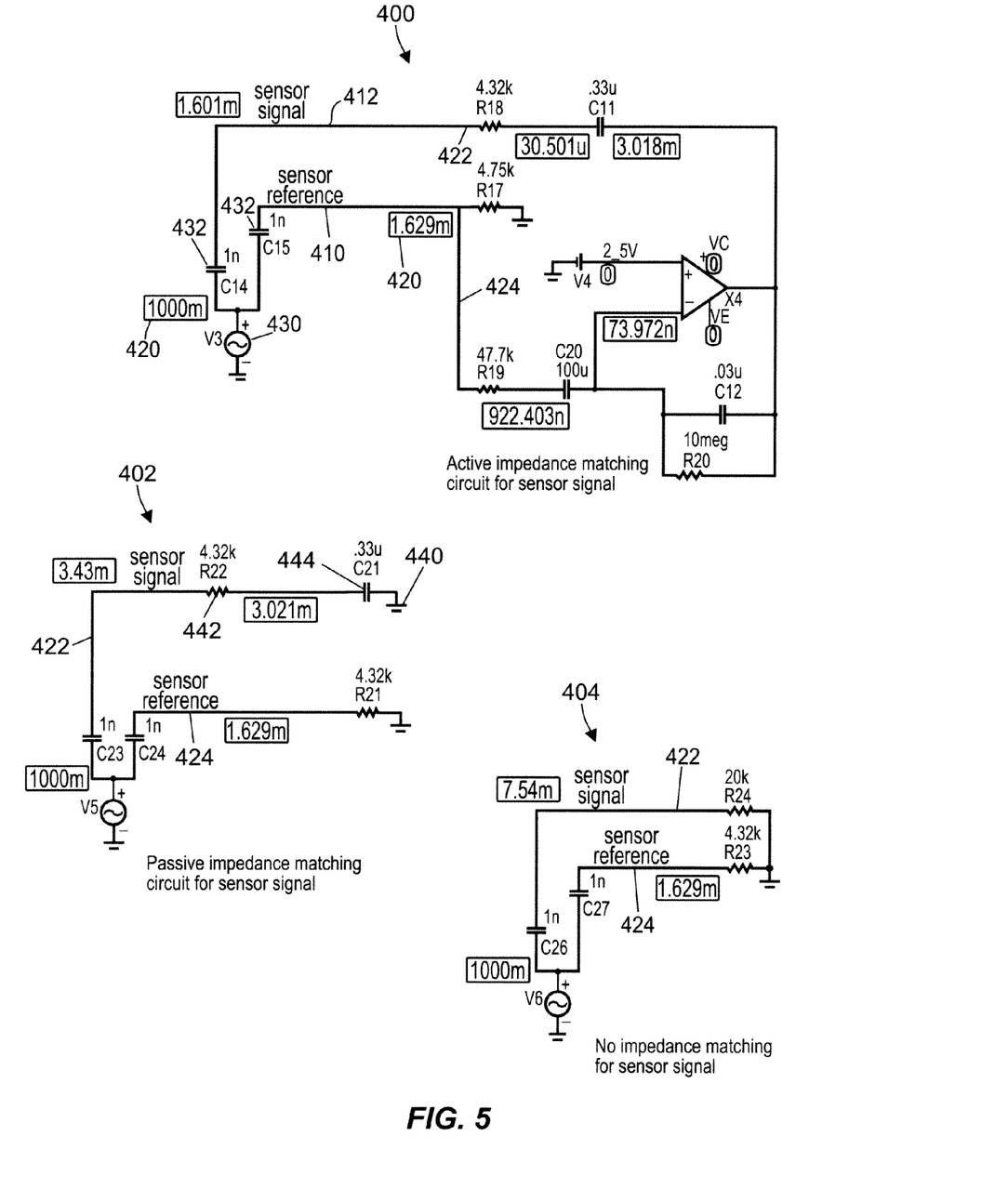
FIG. 5 illustrates AC voltages in three circuits that respectively match AC impedance in an active manner, match AC impedance in a passive manner, or not match AC impedance at all.

To further clarify the operation of the communication system 10, a more general need to match impedance in certain types of circuits is discussed next with reference to FIG. 2. FIGS. 3 and 4 then illustrate electrical circuit diagrams of the common-mode noise reduction circuit 34, along with several other components of the system 10, in several embodiments. Finally, simulated AC voltages in the three example circuits of FIG. 5 illustrate several distinct approaches to processing a sensor signal on a communication link similar to the communication link 30. Specific values of AC voltages illustrated in FIGS. 2 and 5 were generated using circuit design and simulation software.

Figure 2:
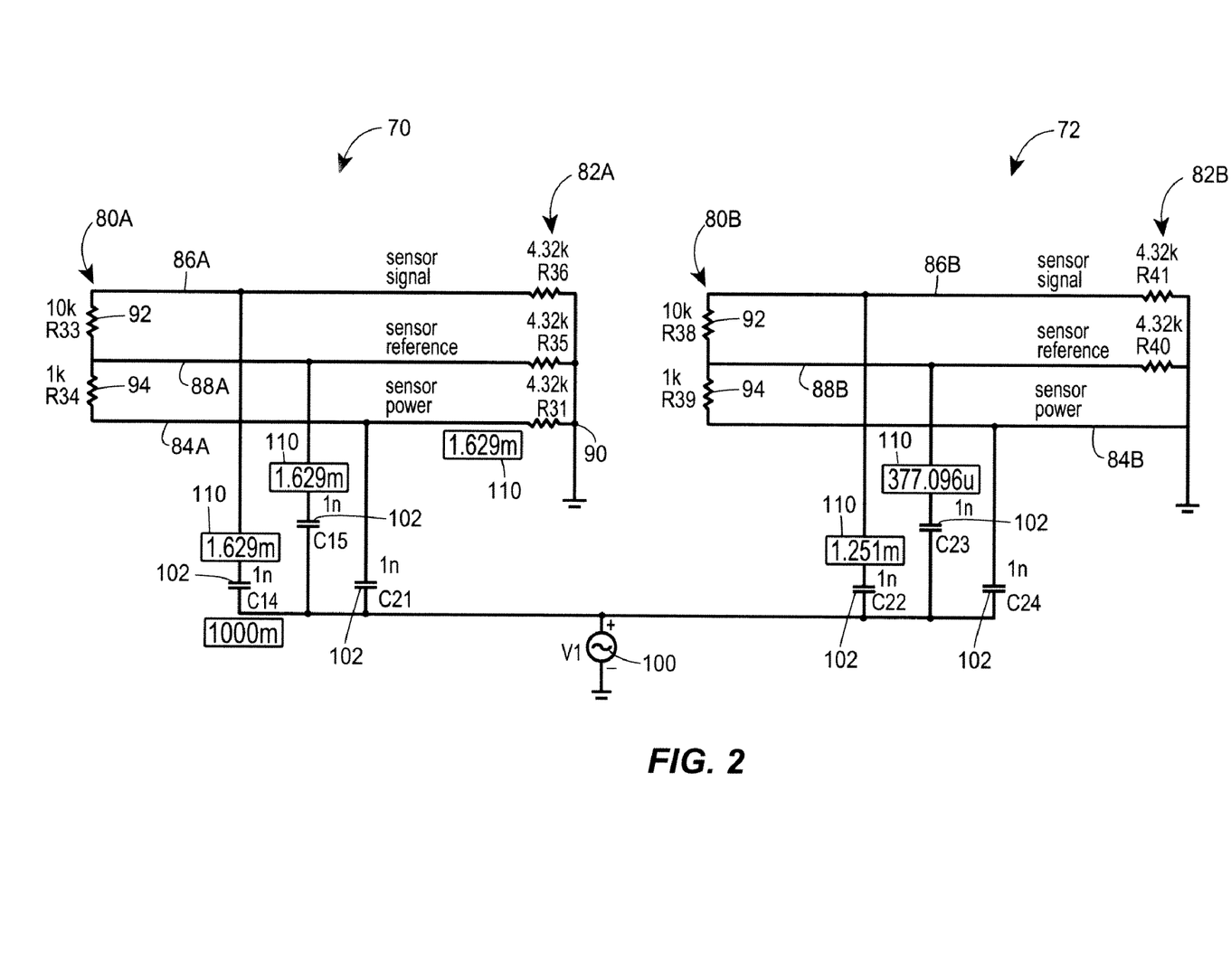
FIG. 2 illustrates AC voltages in two simulated circuits which are identical except for impedance management.

Referring to FIG. 2, circuits 70 and 72 include identical remote sensor circuits 80A and 80B that simulate devices such as the remote device 16 discussed above with reference to FIG. 1. Each of the remote sensor circuits 80A and 80B receives a sensor power signal from a respective input circuit 82A or 82B via a respective sensor power line 84A or 84B. A voltage signal representing a sensor signal travels to the input circuit 82A or 82B via a respective sensor signal line 86A or 86B, and the reference signal travels via a respective sensor reference line 88A or 88B. The circuits 70 and 72 are thus largely similar. However, unlike the circuit 72, the circuit 70 includes a resistor 90 to match the impedance on line 84A with the impedances on the lines 86A and 88A. Meanwhile, at the remote sensor circuits 80A and 80B, a sensor signal on the line 86A or 86B has a significantly higher impedance to the sensor reference signal on the line 88A or 88B (as well as to the sensor power signal on the line 84A or 84B) than a sensor reference signal on the line 88A to the sensor power signal on the line 84A or 84B because of the difference in resistors 92 and 94 of the circuits remote sensor circuits 80A and 80B.

An AC voltage source 100 simulates a source of noise that enters the circuits 70 and 72 via identical coupling capacitors 102. The numbers in boxes 110 illustrate simulated AC voltages that appear at some of the nodes of the circuits 70 and 72 when the AC voltage source 100 couples voltage signals onto to the wires 84A-B, 86A-B, and 88A-C. It will be noted that in the circuit 70 in which the impedances on the wires are matched, the same AC voltage appears at each node marked with the box 110. Consequently, normal-mode noise on the wires 84A, 86B, and 88A is zero. By contrast, in the circuit 72 normal-mode noise is not zero because impedance on the sensor power line 84B does not match the impedance on the sensor signal line 86B or the sensor reference line 88B. Thus, matching impedances on all of the wires 84A, 86A, and 88A at the input circuit 82A allows significant variations in impedances between these wires at the sensor end, i.e., at the remote sensor circuit 80A, with no impact on the immunity of the circuit 70 to noise coupled onto the wires 84A, 86A, and 88A.

Now referring to FIG. 3, the circuit 200 includes a remote sensor circuit 202, a capacitive coupling circuit 204, a sensor excitation circuit 206, a difference amplifier circuit 208, and an active impedance matching circuit 210 which is one of the embodiments of the common-mode noise reduction circuit 34 discussed with reference to FIG. 1. For the purposes of simplicity and clarity, the circuitry of a remote travel sensor is approximated as the sensor circuit 202 having a potentiometer 212 coupled to a sensor excitation line 214, a sensor signal line 216, and a sensor reference line 218. In this approximate representation, the sensor reference line 216 carries a signal indicative of a position of the wiper of the potentiometer 212. The lines 214, 216, and 218 together define a communication link 224 which may be similar to the communication link 30 illustrated in FIG. 1. The communication link 224 may include a shield (not shown) to insulate each of the conducting lines 214, 216, and 218.

The capacitive coupling circuit 204 includes several equal decoupling RF capacitors 230, with each capacitor 230 coupled to one of the wires 214, 216, or 218 and to the case ground 232 of a field device that includes the circuits 204, 208, and 210 (such as the field device 12 of FIG. 1). In the example diagram illustrated in FIG. 3, the decoupling capacitors 230 may additionally simulate the capacitance between the shield of the communication link 224 and each of the conducting lines 214, 216, and 218. It will be noted that depending on the length, type, and other parameters of the communication link 224, the actual capacitance represented by the capacitors 230 may vary, although each of the lines 214, 216, and 218 will be associated with the same capacitance.

In operation, the sensor excitation circuit 206 outputs excitation current on the sensor excitation line 214. A signal indicative of a position of the valve, simulated in FIG. 3 by a wiper signal from the potentiometer 212, travels to the difference amplifier circuit 208 via the sensor signal line 216. The remaining current travels to the difference amplifier circuit 208 via the sensor reference 218. The difference amplifier circuit 208 amplifies the normal-mode signal appearing across the lines 216 and 218 and supplies the amplified signal to an Analog-to-Digital (A/D) converter via an output 240. A resistor 242 defines an input impedance to a signal on the line 218 to circuit ground 250, while a resistor 244 defines, at least in part, an input impedance to a signal on the line 216 relative to the circuit ground 250. In general, the resistors 242 and 244 may differ by one or several orders of magnitude. For example, the resistor 244 in the example illustrated in FIG. 3 provides approximately 100 times more impedance than the resistor 242.

The active impedance matching circuit 210 monitors the signal on the line 216 relative to the signal on the line 218. To prevent common-mode noise from presenting an interfering normal-mode signal to the difference amplifier circuit 208, the active impedance matching circuit 210 maintains equal input AC impedance at nodes 260 or 262 defining the inputs of the sensor signal and of the sensor reference signal, respectively. To this end, an operational amplifier 270 receives a reference voltage signal via a non-inverting input 272 and a signal indicative of the voltage at the node 262 via the inverting input 274. An output 276 of the operational amplifier 270 is coupled to the node 260. Additionally, capacitors 280 and 282 are connected in series between the nodes 260 and 262 and the output 276 or the inverting input 274, respectively. The capacitors 280 and 282 block DC current to prevent the active impedance matching circuit 210 from attenuating the desired signals from the remote sensor circuit 202. The capacitors 280 and 282 thus define relevant frequencies at which the operational amplifier 270 will adjust the voltage at the output 276. Further, a resistor 290 is connected in series between the node 260 and the capacitor 280 to approximately match impedance to circuit ground 250 which the signal on the line 218 "sees" at the node 262. Thus, at the relevant frequencies, the operational amplifier 270 maintains AC voltage at the output 276 to match the impedance to circuit ground at the nodes 260 and 262, but DC signal components remain unaltered at the nodes 260 and 262 to enable accurate processing of the sensor signal at the difference amplifier circuit 208.

In an alternative embodiment, the active impedance matching circuit 210 may be replaced with a passive impedance matching circuit having the resistor 290 coupled between the node 260 and to the capacitor 280, with the capacitor 280 coupled to the circuit ground 250. As discussed below with reference to FIG. 5, this embodiment may provide a smaller reduction in common-mode noise on the link 224 than the active impedance matching circuit 210 illustrated in FIG. 3. However, the cost associated with the passive impedance matching circuit may also be smaller. In general, the common-mode noise reduction circuit 36 may include one or several active impedance matching components (including, for example, the operational amplifier 270), passive impedance matching components (such as resistors, capacitors, inductors, etc.), or combinations of active and passive impedance matching components.

FIG. 4 illustrates a circuit 300 which is generally similar to the circuit 200 discussed above. However, the remote sensor circuit 302, unlike the remote sensor circuit 202, is powered via separate power lines 310 and 312 of a communication link 320. In general, the remote device 12 (see FIG. 1) may be powered autonomously (e.g., equipped with a battery, a solar panel, etc.), with power supplied from a field device via separate power lines such as the lines 310 and 312 of this example, via an excitation signal line 214 as illustrated in FIG. 3, or in any desired manner. As illustrated in FIG. 4, a common-mode noise reduction circuit 330 may interact with the four-line communication link 320 similarly to the circuit 210 discussed above. More specifically, the common-mode noise reduction circuit 330 may match input AC impedance on one of the lines of the communication link 320 to the input AC impedance of other lines of the communication link 320.

In general, a common-mode reduction circuit such as the circuit 210 or 320 may increase or decrease AC impedance on one or more wires of a corresponding communication link. For example, a common-mode reduction circuit may include multiple operational amplifiers to maintain AC voltage at a desired level on multiple wires. Further, a common-mode reduction circuit may include passive components such as resistors or capacitors, active components such as operational amplifier, or both. It will be also noted that by adjusting the values of the capacitors 280 and 282, or by adding further circuit components to define filters, for example, it is also possible to selectively block certain AC frequencies and allow other frequencies to remain unaffected by the common-mode noise compensation circuit.

Still further, a common-mode noise reduction circuit 36 (or the active impedance matching circuit 210, a passive impedance matching circuit including a capacitor and a resistor, etc.) may be provided as an integral part of the circuitry of the field device, as a standalone Application-Specific Integrated Circuit (ASIC) mountable on or inside the field device, or in any desired form.

Finally, FIG. 5 illustrates simulation results for example circuits 400, 402, and 404 which differ in their respective handling of input impedance which the sensor signal sees relative to a circuit ground potential. In particular, the active impedance matching circuit 400 provides active impedance matching between a sensor reference line 410 and a sensor signal line 412. The circuit 400 includes an operational amplifier, capacitors to block DC signal components, a resistor to approximately match DC impedance, and is generally similar to the common-mode noise reduction circuits discussed above. Boxes 420 illustrate AC voltages at several locations in the circuit 400. It will be noted that at nodes 422 and 424, which may be considered to generally represent inputs to a field device or any other device, the AC voltages on the sensor signal line 412 and the sensor reference line 410 are approximately 1.601 mV and 1.629 mV, respectively. Thus, in most if not all practical applications, the AC voltages at the nodes 422 and 424 are sufficiently close to effectively cancel common-mode noise introduces to the lines 412 and 410 from a simulated noise source 430 via equal decoupling capacitors 432.

As a simpler alternative, the passive impedance matching circuit 402 matches input impedance on the lines 410 and 412 by coupling the node 422 to circuit ground 440 via a resistor 442 and a capacitor 444. The simulation results accordingly indicate that the AC voltages at the nodes 422 and 424 are now 3.43 mV and 1.629 mV, respectively. Thus, the active impedance matching circuit 400 provides a better reduction of common-mode noise than the passive impedance matching circuit 402. It will be noted, however, that the passive impedance matching circuit 402 may be sufficient in some applications.

By contrast, the circuit 404 provides neither active nor passive impedance matching. Accordingly, the difference in AC voltages at the nodes 422 and 424 is significant. In this particular example, the AC voltage at the node 422 is approximately 7.54 mV and the voltage at the node 420 is approximately 1.629 mV.

From the foregoing, it will be appreciated that the input AC impedance matching techniques discussed above allow devices to accurately communicate via noise-sensitive communication links in the presence of common-mode noise. These techniques may generally apply to any system in which noise is coupled onto a communication link so that one or more devices using the communication link may "see" the noise as a valid signal. In particular, the techniques described above apply to field devices which communicate with other process control devices using a process control communication protocol and exchange additional data with an auxiliary device such as a remote sensor. It will be also noted that although the examples discussed above refer to the Foundation Fieldbus communication protocol, various embodiments of a common-mode reduction circuit that matches input AC impedance may similarly apply to Profibus, HART, and other communication protocols. Moreover, it is contemplated that in addition to industrial applications, the techniques discussed above may be used in devices operating in household, civil, military, and other environments.

While the present system and methods have been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

What is claimed is:

1. A system operating in a process control environment, the system comprising:
   a field device to perform a process control function in the process control environment;
   a remote device disposed away from the field device to perform an auxiliary function associated with the process control function of the field device;
   a first wired communication link communicatively coupled to the field device and to the remote device to support data communication between the field device and the remote device; and
   a common-mode noise reduction circuit coupled to the field device and to the wired communication link to reduce common-mode noise generated in the first wired communication link;
   wherein the first wired communication link includes a plurality of electrical wires, and wherein each of the plurality of electrical wires connects to the field device at a respective one of a plurality of inputs;
   wherein a first one of the plurality of electrical wires is associated with a first impedance at a first one of the plurality of inputs and a second one of the plurality of electrical wires is associated with a second impedance at a second one of the plurality of inputs, wherein the first impedance is substantially different from the second impedance; and
   wherein the common-mode noise reduction circuit matches the first impedance to the second impedance so that the common-mode noise generates an equal voltage on the first one of the plurality of electrical wires and the second one of the plurality of electrical wires.

2. The system of claim 1, further comprising:
   a second wired communication link communicatively coupled to the field device to support communication of process control data with a process control network.

3. The system of claim 2, wherein signaling on the second wired communication link generates the common-mode noise in the first wired communication link.

4. The system of claim 2, wherein the first communication link is associated with one of normal-mode signaling or differential-mode signaling, and wherein the second wired communication link is associated with a floating ground.

5. The system of claim 1, wherein the field device is associated with a floating ground; and wherein the common-mode noise reduction circuit includes:
   a resistor coupled to a first one of the plurality of inputs to approximately match an impedance at least another one of the plurality of inputs; and
   a capacitor coupled to the resistor and to the floating ground.

6. The system of claim 1, wherein the field device is associated with a floating ground; and wherein the common-mode noise reduction circuit includes an operational amplifier to match AC impedance at least two of the plurality of inputs.

7. The system of claim 1, wherein the system further comprises:
   a process control network including a controller device;
   a fieldbus communication link to support communication of process control data between the field device and the controller device according to a fieldbus communication protocol; and
   wherein the remote device is a sensor that provides sensor data to the field device via the first wired communication link.

8. A method of operating a field device in a process control network, wherein the field device communicates with a remote device via a first wired communication link and with a process control network via a second wired communication link, and wherein the first wired communication link has a plurality of wires connected to the field device via a plurality of respective inputs, the method comprising:

obtaining a first input impedance to a signal on a first one of the plurality of wires at a first one of the plurality of inputs;

obtaining a second input impedance to a signal on a second one of the plurality of wires at a second one of the plurality of inputs; and adjusting the second input impedance to match the first input impedance in order to reduce common-mode noise on the first communication link.

9. The method of claim 8, wherein adjusting the second input impedance to match the first input impedance includes:

providing a substantially equal impedance to AC voltage at the first one of the plurality of inputs and the second one of the plurality of inputs; and providing unaltered impedance to DC voltage at the first one of the plurality of inputs and the second one of the plurality of inputs.

10. The method of claim 8, wherein the field device is associated with a floating ground; and wherein adjusting the second input impedance to match the first input impedance includes:

providing an operational amplifier;

coupling the first one of the plurality of inputs to an input of the operational amplifier; and coupling the second one of the plurality of inputs to an output of the operational amplifier.

11. A field device for use in a network operating in a process control environment, comprising:

an operational unit to perform a physical step in the process control environment;

a first interface coupled to a first communication link to communicate with a remote device;

a second interface coupled to a second communication link to communicate process control information to the network; and a common-mode noise reduction circuit coupled to the first interface to reduce common-mode noise generated in the first communication link;

wherein the field device is associated with a floating ground;

wherein the first communication link includes a plurality of electrical wires coupled to a plurality of respective inputs of the first interface; and wherein the common-mode noise reduction circuit includes an input impedance matching unit to match input impedance on each of the plurality of electrical wires at the respective one of the plurality inputs relative to the floating ground.

12. A field device for use in a network operating in a process control environment, comprising:

an operational unit to perform a physical step in the process control environment;

a first interface coupled to a first communication link to communicate with a remote device;

a second interface coupled to a second communication link to communicate process control information to the network; and a common-mode noise reduction circuit coupled to the first interface to reduce common-mode noise generated in the first communication link;

wherein the first communication link includes a plurality of electrical wires coupled to a plurality of respective inputs of the first interface; and wherein the common-mode noise reduction circuit includes an operational amplifier to maintain input AC impedance associated with at least two of the plurality of electrical wires at a substantially equal level.

13. The field device of claim 12, wherein the common-mode noise reduction circuit further includes a plurality of capacitors to maintain input DC impedance substantially unaltered.

14. The field device of claim 11, wherein the field device is a digital valve controller; wherein the remote device is a remote sensor; wherein the second communication link supports a communication protocol associated with a floating ground.

15. The field device of claim 14, wherein the communication protocol is Foundation™ Fieldbus.

16. The field device of claim 11, wherein the common-mode noise reduction circuit is a passive circuit having a resistor and a capacitor.

17. A noise-reduction circuit for use with a device coupled to a wired communication link, wherein the device includes a plurality of inputs to connect to a plurality of wires of the wired communication link, the noise-reduction circuit comprising:

a first circuit input coupled to a first one of the plurality of wires at a first one of the plurality of inputs;

a second circuit input coupled to a second one of the plurality of wires at a second one of the plurality of inputs;

an impedance matching unit arranged to obtain an input AC impedance associated with the second one of the plurality of inputs, to obtain an input AC impedance associated with the first one of the plurality of inputs, and to adjust a first one of the AC impedances to match a second one of the AC impedances to provide matching input AC impedances at the first one of the plurality of inputs and at the second one of the plurality of inputs.

18. The noise-reduction circuit of claim 17, wherein the impedance matching unit includes an operational amplifier comprising:

a non-inverting input associated with a reference voltage signal;

an inverting input coupled to the first circuit input; and an output coupled to the second circuit input to maintain AC voltage at the first circuit input and the second circuit input at a substantially equal level.

19. The noise-reduction circuit of claim 18, wherein the impedance matching unit further comprises:

a first capacitor connected in series between the inverting input and the first circuit input to block DC voltage; and a second capacitor connected in series between the output and the second circuit input to block DC voltage.

20. The noise-reduction circuit of claim 18, wherein the impedance matching unit further comprises a resistor connected in series between the output and the second circuit input to approximately match impedance on the first one of the plurality of wires.

21. The noise-reduction circuit of claim 17, wherein the device is a field device adapted to perform a physical step in a field and communicate with a network operating in a process control environment.

22. The noise-reduction circuit of claim 17, wherein the device is associated with a floating ground, and wherein the noise-reduction circuit matches the input AC impedances relative to the floating ground.

* * * * *

UNITED STATES PATENT AND TRADEMARK OFFICE
CERTIFICATE OF CORRECTION

| | | |
|---|---|---|
| PATENT NO. | : 8,260,563 B2 | Page 1 of 1 |
| APPLICATION NO. | : 12/392864 | |
| DATED | : September 4, 2012 | |
| INVENTOR(S) | : Stephen G. Seberger | |

It is certified that error appears in the above-identified patent and that said Letters Patent is hereby corrected as shown below:

In the Specification:

At Column 5, line 38, "protected" should be -- protect --.

Signed and Sealed this
Fifteenth Day of July, 2014

Michelle K. Lee
*Deputy Director of the United States Patent and Trademark Office*